Patented Jan. 25, 1949

2,460,009

UNITED STATES PATENT OFFICE 2,460,009

VITAMIN COMPOSITIONS

Wolfgang Huber, Hillbrow, Castleton on Hudson, and Werner Richard Boehme, Albany, N. Y., assignors, by mesne assignments, to Winthrop-Stearns Inc., New York, N. Y., a corporation of Delaware No Drawing. Application March 20, 1944, Serial No. 527,343

1 Claim. (Cl. 260—251)

This invention relates to sparingly water-soluble salts of thiamine and to a process for preparing them.

It is a principal object of this invention to provide as fortifying agents physiologically active salts of thiamine suitable for use in those instances where a fortifying agent of low water-solubility is desired, for instance, in the enrichment of cereals subjected to rinsing before being cooked.

In certain regions, especially in the Southern States, cereals such as hominy and rice form an important part of the human diet. Since modern methods of preparing cereal crops for use as food result in the removal of the major portion of the vitamin content, the cereal becomes a poor source of thiamine. However, cereals are an excellent source of carbohydrates and it is desirable to increase their food value by adding to them certain nutritive substances, including thiamine.

A frequently-used method for food enrichment consists in spraying the food with a solution of the fortifying agent and subsequently evaporating the solvent to leave a coating of the fortifying agent on the food particles. In an alternative method the fortifying agent is added in solid form and thoroughly mixed with the food, the particle size of the fortifying agent being conditioned somewhat by that of the food, since an even distribution should be maintained.

Neither of the above methods is satisfactory for the addition of thiamine to the grains of cereals. It is customary among consumers of hominy and rice, for example, to subject the particles before cooking to a more or less vigorous rinsing with water, any particles of abnormal appearance being picked out and discarded. Thiamine, being water-soluble, is quickly dissolved from the particles if it has been applied by means of a spray; or, if it has been added as a solid, it is either dissolved or is likely to be removed because of its physical appearance.

The thiamine salts prepared according to the present invention are especially adapted to the overcoming of the previous difficulties encountered in producing enriched cereals. These salts are at least as active physiologically as thiamine chloride hydrochloride and are capable of being fixed upon the surface of cereal particles in such a manner as to avoid loss of vitamin B₁ by rinsing.

The compounds of our invention are prepared by bringing together aqueous solutions of a water-soluble thiamine salt and an acid, or a water-soluble salt thereof, selected from the class consisting of 2-ethylhexyl hydrogen sulfate, cholestenone-6-sulfonic acid, and methane-1,1-bis-(2-hydroxy-3-naphthoic acid). The precipitate which forms is readily purified by recrystallization, if necessary.

Our invention is illustrated by the following examples but is not limited thereto.

Example 1

A solution of 6.74 g. of thiamine chloride hydrochloride in 25 ml. of water is mixed with 18.6 g. of a 25% solution of sodium 2-ethylhexyl sulfate. Within an hour a precipitate begins to form and after cooling the solution in an ice bath for several hours the colorless crystals are collected on a filter. After two recrystallizations from 50 ml. portions of water at 60° C. there is obtained 4.5 g. of thiamine 2-ethylhexyl sulfate, $C_{28}H_{52}N_4S_3O_9$, M. P. approximately 148–149° C.

Example 2

A solution of 1.69 g. of thiamine chloride hydrochloride in 30 ml. of water and a solution of 2.17 g. of cholestenone-6-sulfonic acid in 30 ml. of water are run simultaneously with vigorous stirring during a period of thirty minutes into 50 ml. of water. Precipitation begins immediately and after stirring for another hour the white precipitate is filtered off. After three recrystallizations of this product from dilute alcohol, there is obtained 2.3 g. of thiamine cholestenone-6-sulfonate, $C_{66}H_{102}N_4S_3O_9$. It decomposes slowly above 200° C.

Example 3

Six and seventy-four hundredths grams of thiamine chloride hydrochloride and 4.5 g. of sodium methane-1,1-bis-(2-hydroxy-3-naphthoate) are each dissolved in 100 ml. portions of water. The two solutions are run simultaneously with vigorous stirring during a period of thirty minutes into 200 ml. of water. A precipitate forms immediately, and after stirring the solution one hour longer, the pale yellow solid is separated, washed with water until free of chloride ion, and dried. The product is purified by recrystallizing twice from 80% aqueous peroxide-free dioxane. There is obtained as the dihydrate 4.3 g. of thiamine methane-1,1-bis-(2-hydroxy-3-naphthoate), $C_{35}H_{32}N_4SO_7 \cdot 2H_2O$, M. P. above 350° C.

We claim:

Thiamine-methylene-bis-2-hydroxy-3-naphthoate.

WOLFGANG HUBER.
WERNER RICHARD BOEHME.

(References on following page)

REFERENCES CITED

The following references are of record in the file of this patent:

UNITED STATES PATENTS

| Number | Name | Date |
|---|---|---|
| 1,872,826 | Schuleman | Aug. 23, 1932 |
| 2,052,027 | Harris | Aug. 25, 1936 |
| 2,161,857 | Davidson | June 13, 1939 |
| 2,328,594 | Williams | Sept. 7, 1943 |
| 2,328,595 | Williams | Sept. 7, 1943 |

FOREIGN PATENTS

| Number | Country | Date |
|---|---|---|
| 816,432 | France | 1937 |
| 819,596 | France | 1937 |

OTHER REFERENCES

Chem. Abstracts, vol. 33, page 7378.